(12) United States Patent
Seifert

(10) Patent No.: US 7,120,538 B2
(45) Date of Patent: Oct. 10, 2006

(54) VEHICLE GUIDANCE SYSTEM FOR AUTOMATIC VEHICLE GUIDANCE

(75) Inventor: Jost Seifert, Schliersee (DE)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 10/483,578

(22) PCT Filed: Jul. 12, 2002

(86) PCT No.: PCT/DE02/02566

§ 371 (c)(1),
(2), (4) Date: Jan. 12, 2004

(87) PCT Pub. No.: WO03/007100

PCT Pub. Date: Jan. 23, 2003

(65) Prior Publication Data

US 2004/0186660 A1  Sep. 23, 2004

(30) Foreign Application Priority Data

Jul. 13, 2001  (DE) .............................. 101 34 055

(51) Int. Cl.
*G01C 21/00* (2006.01)
*G06G 7/70* (2006.01)

(52) U.S. Cl. ................. 701/200; 180/169; 318/580

(58) Field of Classification Search ............... 701/200, 701/23, 28, 207, 209, 211, 214, 217; 180/169, 180/116, 119, 168; 318/580, 587
See application file for complete search history.

(56) References Cited

U.S. PATENT DOCUMENTS

| | | | | |
|---|---|---|---|---|
| 3,927,306 A | * | 12/1975 | Miller | .................... 701/15 |
| 4,040,374 A | | 8/1977 | Greene | |
| 4,811,230 A | | 3/1989 | Graham et al. | |
| 4,887,223 A | * | 12/1989 | Christian | .................... 382/153 |
| 5,281,901 A | * | 1/1994 | Yardley et al. | ............. 318/587 |
| 5,307,271 A | * | 4/1994 | Everett et al. | ................ 701/24 |

(Continued)

FOREIGN PATENT DOCUMENTS

DE    1815370    7/1970

(Continued)

OTHER PUBLICATIONS

Rudolf Brockhaus, Flugregelung (Flight Regulation), Springer-Verlag, 1994, ISBN 3-540-554 16-5, chapter 17.4.1 (pp. 632-634), chapter 20.3.4 (pp. 734-738).

*Primary Examiner*—Dalena Tran
(74) *Attorney, Agent, or Firm*—W. F. Fasse; W. G. Fasse

(57) ABSTRACT

A track guidance system for guiding a vehicle with reference to pre-specified desired values of at least one application phase, includes a script development function (3) for developing an application script that defines pre-specified desired values of application phases according to which the vehicle is to be guided, at least one track regulator (12; 12a, 12b, 12c) for guiding the vehicle with reference to the pre-specified desired values, an input function (2) for the user to develop a regulator matrix that allocates track regulators to the application phases, an application control (4) for controlling the time sequence of the application phases on the basis of the corresponding pre-specified desired values, a regulator control (10) for activating the respective track regulator relevant in the respective application phase, whereby the respectively active track regulator (12; 12a, 12b, 12c) transfers its status for control or monitoring to the regulator control (10).

6 Claims, 2 Drawing Sheets

| | Track Regulator 1 | Track Regulator 2 | Track Regulator 3 | ... | Track Regulator n |
|---|---|---|---|---|---|
| First Track Section | 1 | 1 | 0 | 0 | 0 |
| Takeoff | 1 | 0 | 1 | 0 | 0 |
| M3 | 1 | 0 | 0 | 0 | 0 |
| ... | | | | | |
| Last Track Section | 1 | 0 | 1 | 0 | 0 |

U.S. PATENT DOCUMENTS

| | | | |
|---|---|---|---|
| 5,812,267 A * | 9/1998 | Everett et al. | 356/614 |
| 6,163,744 A | 12/2000 | Onken et al. | |
| 6,336,072 B1 * | 1/2002 | Takayama et al. | 701/200 |
| 6,349,249 B1 * | 2/2002 | Cunningham | 701/28 |
| 6,629,028 B1 * | 9/2003 | Paromtchik et al. | 701/23 |

FOREIGN PATENT DOCUMENTS

| | | |
|---|---|---|
| DE | 2713140 | 10/1978 |
| DE | 3783535 | 5/1993 |
| DE | 19604931 | 8/1997 |
| WO | WO 01/48573 | 7/2001 |

* cited by examiner

|  | Track Regulator 1 | Track Regulator 2 | Track Regulator 3 | ... | Track Regulator n |
|---|---|---|---|---|---|
| First Track Section | 1 | 1 | 0 | 0 | 0 |
| Takeoff | 1 | 0 | 1 | 0 | 0 |
| M3 | 1 | 0 | 0 | 0 | 0 |
| ... | | | | | |
| Last Track Section | 1 | 0 | 1 | 0 | 0 |

Fig.3

VEHICLE GUIDANCE SYSTEM FOR AUTOMATIC VEHICLE GUIDANCE

FIELD OF THE INVENTION

The invention relates to a vehicle guidance system and a method for the carrying out of an automatic vehicle guidance, whereby the invention basically relates to all types of vehicles such as motor vehicles, ships and in particular also aircraft.

BACKGROUND OF THE INVENTION

Regulating loops, which are superposed or super-ordinated over the actual vehicle regulation or control, are realized in automatic vehicle guidance systems. For example, a vehicle guidance system involves maintaining target pre-specifications for the purpose of the navigation. Particularly, in modern aircraft with automatic regulation, which is realized with the aid of the so called fly-by-wire control systems, autopilot functions are superposed on the flight control functions. In that context, on the basis of a command branch, for example due to the vertical accelerations commanded by the pilot, the regulation or regulating system includes feedbacks for the stabilization of the regulating loop. The autopilot operating modes superposed on these regulation functions in a regulation technical manner can relate to various flight phases, for example to the terrain following flight, in which a prescribed height or elevation above the ground is to be maintained. Also, certain flight paths can be prescribed for navigation or for landing approach procedures, the maintenance of which flight paths is effectuated by the aircraft by means of automatic autopilot operating modes.

Generally, in these autopilot operating modes, for respectively provided application or operating types of the vehicle, typically a nominal or desired parameter, such as a desired speed, a desired altitude, or a prescribed travel direction is adjustedly set, the maintenance of which desired parameter is effectuated by the command branch of the respective autopilot function. Thus, in that context, the pilot has the possibility, dependent on the respective flight situation, to select nominal or desired parameters and to select or call up prescribed operating modes, which the aircraft can then carry out without manual intervention of the pilot.

A disadvantage of these methods is that only a limited number of pre-defined autopilot operating modes is available to the pilot. The functionality of present-day autopilots is limited in future vehicle guidance systems, in which there exist the requirement of an increase of the number of the autopilot operating modes to be provided as well as increased demands on the flexibility of such operating modes.

Flight management systems, with which application or operating phases are run through, which are influenceable, are described in the publications: Rudolf Brockhaus, Flugregelung (Flight Regulation), Springer-Verlag, 1994, ISBN 3-540-554 16-5, chapter 17.4.1 (pages 632–634), chapter 20.3.4 (pages 734–738); DE 37 83 535 T2; DE 196 04 931 A1; and WO 01/48573 A1. It is the object of the invention to provide an automatic vehicle guidance system as well as a method for the carrying out of an automatic vehicle guidance, which is adjustedly settable to a plurality of application or operating modes, with a small effort and expense.

SUMMARY OF THE INVENTION

According to the invention, fixed prescribed operating modes are no longer implemented in the respective concerned vehicle guidance system, as is provided in the prior art, but rather, at least one basis or path or track regulator that is configurable by means of an application or operating script and a regulator matrix is utilized, which allows an embodiment of a guidance function and therewith of an autopilot operating mode dependent on an application mode or application phase of the vehicle. Thereby, autopilot operating modes can be defined, even during the application or the use thereof, particularly dependent on prescribed application modes or changes of application modes or phases, and can be activated in an existing path or track guidance system. It is advantageous in the invention, that the embodiment or definition of autopilot operating modes can be carried out even during the use of the vehicle by the pilot or other users.

A further advantage of the invention is that, with the aid of the method according to the invention, the vehicle path as well as also operation sequences of the vehicle application or utilization, and particularly aircraft maneuvers, can be reproduced. Particularly in aircraft, it is thereby possible, for example, to transmit entire application or mission operation sequences to a greater number of flying devices or aircraft independent of the respective type, or to multiply carry these out. This can be advantageously utilized in the carrying out of simulations.

Also, an advantage of the invention is that a greater functionality is achievable in comparison to known autopilot operating modes, that is to say, due to a combination of basic regulators, there arises a greater number of operating modes, which additionally are specially adaptable to the respective application phase.

Through a hierarchical construction of the vehicle track or path guidance system according to the invention, this system can be quickly adapted to every vehicle. Merely the basic regulators must be designed in a vehicle-typical manner.

With the inventive solution it is further possible to replace the pilot in many fields of the vehicle technology, and thus to make unmanned vehicles available for a larger field of application.

Similarly, it is possible to reproduce vehicles and application modes thereof and to use these for simulation purposes. In further simulations, complex traffic situations with many participating vehicles can be exactly repeated or simulated, without a data recording being necessary.

BRIEF DESCRIPTION OF THE DRAWING

In the following, the invention is described in connection with the accompanying figures, which show:

FIG. 3 an exemplary illustration of a regulator or logic matrix for the switching of at least one path or track regulator, with which an operating mode is configured or defined according to the invention.

DETAILED DESCRIPTION OF PREFERRED EXAMPLE EMBODIMENTS OF THE INVENTION

Figure 1:
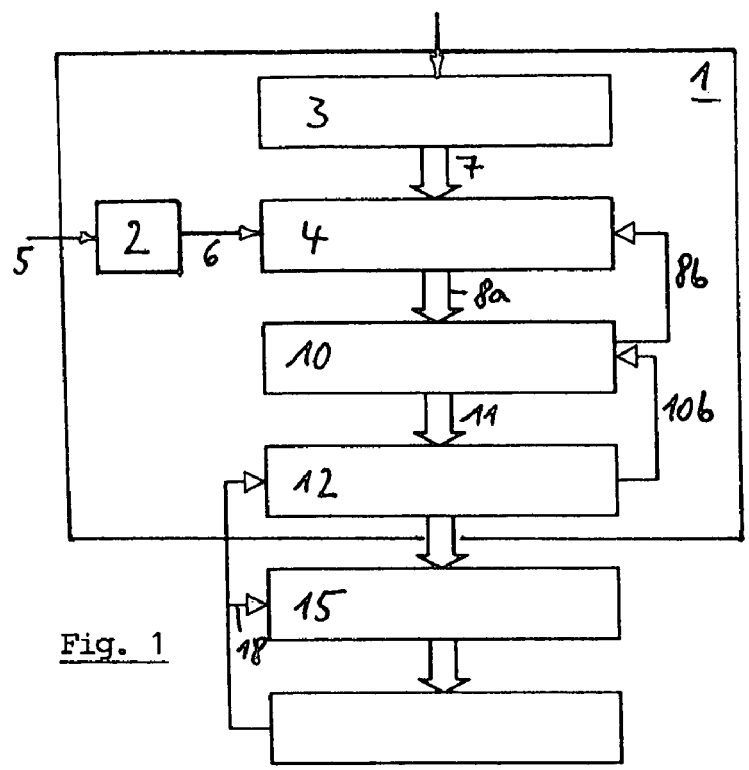
FIG. 1 a functional illustration of the vehicle guidance system according to the invention and its integration in a vehicle system.

The vehicle path or track guidance system 1 according to the invention includes a regulator allocation unit embodying an input function 2 for a regulator or logic matrix, a script development function 3 and an application or operating control 4. The script development function 3 is provided for the purpose of delivering to the application control 4, via a functional connection 7, an application script in the form of a data set that describes values of application phases, according to which the vehicle is to be guided, on the basis of script inputs that are carried out (i.e. inputted) by a user. On the basis of available track or path regulators and application phases or respectively pre-specified desired values coming into consideration, and a recieved input 5, the input function 2 establishes a regulator or logic matrix, which is similary transmittable over a functional connection 6 to the application control 4.

The application script, or script, defined in the script development function 3 describes application phases or path or track sections in their temporal and logical operation sequence, according to which the vehicle is to be guided by means of the vehicle guidance system 1 according to the invention. The application script describes at least one application phase and preferably plural application phases according to at least one pre-specified nominal or desired value provided for the respective application phase. Also the logical and or temporal operation sequence of the application phases is fixed by the application script. This can be achieved through the arrangement, for example a line-by-line arrangement, of a description of the application phases. In that context, each line can be seen as a command line for the respective concerned application phase.

As an example for a line-by-line arrangement of application phases of a vehicle described in a script language, in the following there are described application phases of a flying device, as they may be provided in an application script according to the invention. The developing or establishing of an application script can be carried out with a text editor.

Init (position X, Y, Z, speed=0, heading=180)
Takeoff (speed=120, heading=180)
Climbing Flight (speed=130, heading=90, altitude=3000)
Cruise Flight (speed=200, heading=110, altitude=5000)
Right Curve (speed=200, heading=180, altitude=5000, roll angle=60)
M3 ( )
Landing (speed=120, heading=70, position X, Y, Z).

Herein, "Init" means a first phase or the beginning of the application. The numerical values represent values in pre-determined units. The expression "Position X, Y, Z" stands vicariously for a certain position fixed in spacial coordinates. Instead of the designation of the application phase (for example Takeoff), an index to the corresponding line in the regulator matrix can also be used. For example, M3 ( ) means that the application phase according to line 3 of the regulator matrix is to be used.

An application phase is described in the application script with a predefined command with free transmission or delivery parameters. In the carrying out of a command, in which no value is specified, pre-set values can be used, which are stored either in the regulator control 10 or in the respective path or track regulators.

The operation sequence of application phases or path or track sections described by the application script is controlled by the application control 4, and transferred or delivered line-by-line via a functional connection 8a to a regulator control 10, which further passes on these application phases successively according to the sequence prescribed in the script via a functional connection 11 to at least one path or track or basic regulator 12, for being processed thereby, either modified or not modified.

Figure 2:
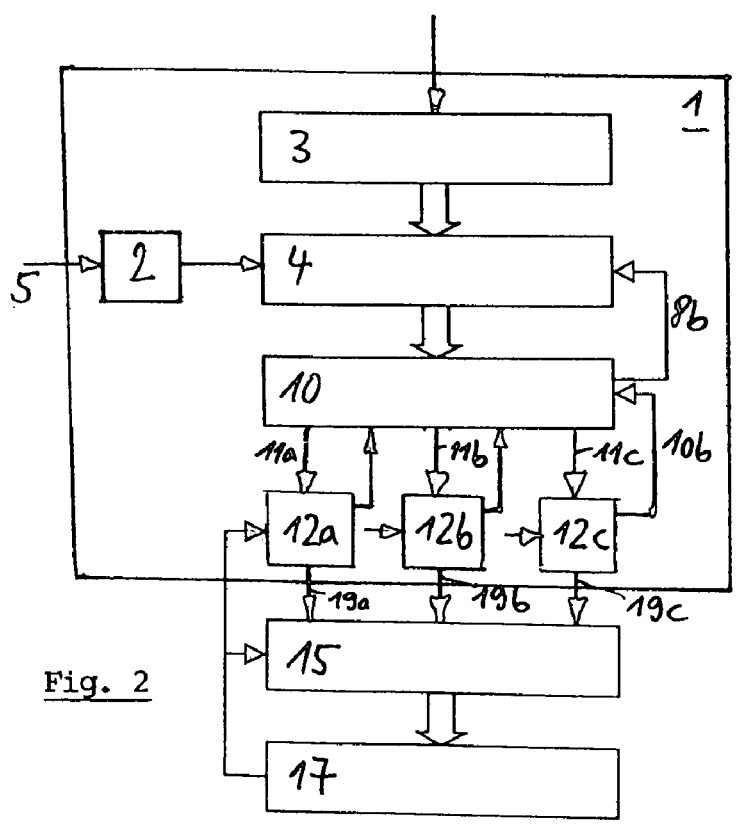
FIG. 2 a functional illustration for a further embodiment of the vehicle guidance system according to the invention.

If plural, i.e. at least two, path or track regulators 12 are arranged in the vehicle guidance system 1, then there is provided respectively one functional connection 11 from the regulator control 10 to respectively each path or track regulator 12. In the FIG. 2, there is illustrated an embodiment of the vehicle guidance system 1 with three path or track regulators 12a, 12b, 12c, which are respectively connected via a functional connection 11a, 11b, or 11c respectively with the regulator control 10. The path or track section pre-specifications designated in the script are transferred or delivered in the sequence provided according to the script via the respective connections 11a, 11b or 11c respectively to the respective responsible track regulator 12a, 12b, or 12c.

The logic or regulator matrix transferred or delivered from the application control 4 to the regulator control 10 contains the information regarding which path or track regulator 12 or 12a, 12b, 12c is to be used for carrying out the track guidance for each path or track section described in the application script. The regulator matrix can be fixedly prescribed, because the track regulators provided for a track guidance system according to the invention are implemented therein, in order to be activatable for a corresponding application phase. It may also, however, with the aid of the input function 2, be modifiable or even entirely developable or configurable for certain application phases, particularly for special defined applications. By means of the input function 2, through a suitable input 5, a user of the vehicle, i.e. for example a pilot or another user, can alter or supplement or newly develop the regulator matrix at any time, i.e. even during an application phase of the vehicle, for example with a vehicle-supported operating arrangement or in a ground station. The application script, which is similarly transferred from the application control 4 to the regulator control 10, prescribes according to which desired values the respective track regulator is to effectuate the track guidance in the respective concerned application phase. Thus, by means of the regulator matrix specified or stored in the regulator control 10, for the respective current application phase, the track regulators needed therein are activated by the regulator control 10, or unneeded track regulators are deactivated. The regulator matrix, which is transferred to the regulator control 10 via the application control 4, serves for the switching of the needed track regulators 12 or 12a, 12b, or 12c. It contains the information, which track regulators are to be used in an application phase. Hereby also conflicts are prevented, which could arise if two similar but not compatible track regulators would be activated simultaneously. In comparison thereto, it is specified in the application script, according to which nominal or desired values or nominal or desired pre-specifications these track regulators are to regulate respectively in each application phase.

An incomplete illustration of an exemplary regulator matrix is illustrated in the FIG. 3. Therein, path or track sections are entered row-wise and the use of the track regulators is entered column-wise. In that context, the number "1" means that the track regulator of the respective concerned column of the matrix is needed for the track regulation in the application phase respectively designated by the respective row, while the number "0" means that the track regulator determined by the column is not needed in the application phase determined by the row.

The regulator matrix is available as a data set. Thereby, the data structure of the data set does not need to comprise the matrix form. In the regulator matrix, an allocation between track regulators and application phases can also be effectuated, for example, in logical or other form. This allocation can also take place in a hardware-based manner through a corresponding coupling of the respective track regulators. Essential is an allocation between the implemented track regulators, which are activatable and de-activatable by a regulator control 10, and the application phases, for which the vehicle is to be operated in an automatic operating mode.

Each track regulator 12 or 12a, 12b, 12c regulates the path or track of the vehicle according to the nominal or desired track values or desired value pre-specifications stored in the application script, which values are available for those application phases for which the track guidance system is to be active. The regulated or controlled value is one of the degrees of freedom in the vehicle fixed or track fixed coordinate system, or derivations thereof, or values determined therefrom, for example the flight altitude. Additionally, the track regulator controls or monitors whether vehicle-typical system limits, such as, for example, a maximum speed, are exceeded, and maintains the vehicle within a range that is acceptable for this system. For the respective application phase of the vehicle, an allocation of the track regulator 12 or 12a, 12b, or 12c provided for this application phase is carried out by means of the regulator matrix. For this purpose, the regulator matrix is transferred from the application control 4 via the connection 8a to the regulator control 10, which carries out the allocation of the track regulators 12 or 12a, 12b or 12c. From there, the pre-specified nominal or desired values, according to which the track regulators are to operate, arrive via a connection 11, or 11a, 11b and/or 11c to the track regulator or regulators for which the respective pre-specified nominal or desired values are determined. For example, a flight altitude regulator of an aircraft receives a nominal or desired altitude as a pre-specified nominal or desired value. The status of the respective active track regulator is sent via the connection 10b continuously or in time intervals to the regulator control 10, whereby the status is preferably determined from current internal regulator values preferably in the respective track regulator. From this, if applicable, the termination or ending of the application phase can be derived. If, for example, in a certain flight phase a nominal or desired position or a nominal or desired speed is to be reached, the regulator control determines directly from the position or speed data whether the application phase is to be ended. With respect to the ending of the respective application phases, other pre-scribed values independent of vehicle condition or state values, such as, for example, pre-specified time values, may also exist, which the regulator control 10 or the application control 4 can then interrogate or poll.

Thus, an application phase can be ended when at least one nominal or desired value of a track regulator 12 has been reached. As an alternative thereto, the duration of the application phase can be limited. In this context, the track regulator measures the time since its activation by the regulator control 10, and compares it with the pre-specified value from the application script (e.g. t<60 seconds). Upon exceeding the pre-specified time value, the track regulator 12 via the connection 10b triggers the regulator control 10 on its part to send the reply signal "application phase ended" 8b to the application control 4. Similarly conceivable is a monitoring of switch positions or conditions by the track regulators 12 with the goal of determining and further conveying the end of an application phase.

The application control 4 thus receives from the regulator control 10 via the connection 8b, a reply signal whether the respective application phase has been ended. If this applies, the command line for the next application phase is transferred from the application control 4 to the regulator control 10. After processing of the entire application script, the track guidance of the vehicle is ended. The application control 4 offers the possibility of transferring informations regarding the current maneuver to the operator so that he can follow the mission. The control or monitoring of the application control 4 is carried out automatically or via remote operation. For this purpose, functions such as "ON/OFF" for switching on and off the operating mode or the track guidance functions in their entirety, and "JUMP OVER LINE" in order to alter the sequence specified in the application script, can be made available. In "INITIALIZING", the currently available application script and the regulator matrix as well as starting values of the prescribed operating modes are read-in from adjusted pre-settings or the application script into the application control 4.

For the track regulators 12 or 12a, 12b or 12c, classical PD or PID regulators and their layout methods can be used. For the determination of the condition of a track regulator, the internal regulator values (for example proportional spacing or difference between desired and actual value, or integrator contents and closing or approaching speed to the nominal or desired value) are taken into consideration. As conditions or states, for example "active and desired value reached", "active and desired value not reached", and "inactive" are distinguished from each other. For the current or present condition transferred via the connection 10b to the regulator control 10, for example "active and desired value reached", in this example all relevant internal regulator values must lie within a pre-defined value range, otherwise the status "active and desired value not reached" would be emitted.

The concerned track regulator 12a, 12b or 12c is connected via connections 19a, 19b or 19c to a vehicle regulator 15 of a vehicle control 17 or directly to the vehicle control 17 if no vehicle regulator 15 is provided. The vehicle control 17 typically comprises the control devices and if applicable also their adjusting or activating drives for operation of the same. The control or monitoring via switch positions is also conceivable.

As an example, modern aircraft comprise an automatic control system for the steering or control and stabilizing of the aircraft. Thereby, the control is functionally superposed or super-ordinated over the stabilization. This calculates, from pilot inputs carried out by means of control sticks, among other things with consideration of the aircraft characteristics and the flight conditions in space, nominal or desired commands, for example for the adjusting or actuating drives of the control surfaces, with which the aircraft can be held on a nominal or desired path or track determined by the pilot inputs. For this purpose, these nominal or desired commands are transferred electrically from the control system to the adjusting or actuating drives. Such control systems have also been realized in motor vehicles. Also in that context, stabilization functions are provided, whereby the regulated or controlled values can be different from those in control systems used in aircraft. The track guidance system according to the invention can be allocated to control systems that are suitable generally for vehicles, that is to say aircraft, ships or street and land vehicles. The automatic track guidance system according to the invention can, however, also be used for vehicles without such an automatic control system. Thus, the nominal or desired command determined by the respective track regulator 12 or 12a, 12b, 12c is conveyed, directly or via a vehicle regulator 15, to the control devices or elements of the application vehicle, such as for example, a steering wheel, a pilot stick, a push rod, or a gas pedal, or their respective adjusting or actuating drives.

Furthermore, the vehicle control 17 comprises a measuring arrangement or plural measuring arrangements, which transfer their measured values to the vehicle regulators 15 or the provided track regulators 12 or 12a, 12b or 12c. The feedback values 18 provided for the vehicle regulator 15, depending on the regulation concept, can be condition or state values of the adjusting or actuating units of the vehicle control 15 for the control of the vehicle, such as for example an actual position of an adjusting or actuating unit and/or condition or state values of the vehicle, such as for example its position in space. Similarly, a feedback of such values to the track regulators 12 or 12a, 12b or 12c is provided.

The application control 4 controls the time sequence or progression of the freely definable track sections of an application phase. For example, in an aircraft, the application phase climbing flight follows the maneuver "takeoff" (see the preceding example of the application script). Upon the interruption or alteration of application phases, a corresponding application script or at least a command of the application script is to be established and transferred to the application control 4.

The various functions of the vehicle guidance system 1, namely the application control 4, the regulator control 10, and the track regulator 12, can be implemented in one or more hardware modules. Preferably these are implemented in a track guidance module. Alternatively thereto, additionally the vehicle regulator 15 and, if applicable, further functions can be integrated in a hardware module.

Preferably, vehicle-typical track regulators (in the application of the invention, for example, referring to the flight speed or angle of attack of the aircraft), interpreters, control software for program operation (for the carrying out of user commands such as "on/off", "initializing", "jump over line"), input/output software for the data transmission and other functions are further allocated to the track guidance module or implemented therein.

In the following, the functional manner of operation or the method for the carrying out of the track guidance according to the invention will be described:

In the following, the functional manner of operation or the method for carrying out the track guidance according to the invention will be described:

The application script and the regulator matrix are defined beforehand by a user and are transmitted via a data line (radio, network, databus, or the like) from any desired workplace computer to the mission computer in the vehicle. In the definition of the application script and of the regulator matrix, one proceeds from the types of track regulators implemented in the track guidance system. An encryption or a compression is possible before or after the transmission. The application control 4 receives the application script and the regulator matrix and, for example through activation of the function "INITIALIZING", reads these completely into a corresponding memory, which maintains the application script and the regulator matrix available for the application control 4. The track guidance system 1 possesses an interpreter, which allocates the text of both the application script as well as the regulator matrix to commands in the machine language of the track guidance module. The pilot or some other user, for example also a user of a ground station, can define application modes or types, which can be effectuated with the track regulators 12 implemented in the track guidance system 1. Thereby, application modes or types are defined from nominal or desired path or track sections by means of the application script. In connection with a definition or modification of application types or modes from a ground station, in a special embodiment of the invention, the application script provided through the script development function 3 and optionally also the regulator matrix provided through the input function 2 can be transmitted by telemetry into the track guidance system 1.

Via the functional connection 7 or a different transmission path, the track guidance system 1 can send back current informations about the mission to a workplace computer of the user or operator, so that he can follow the applications or operations of the vehicle and if applicable can interrupt or modify a current application.

The interpreter is allocated to the regulator control or is a part thereof. The interpreter reads the text and allocates numbers referencing application phases to the words used in the application script, and by means of the regulator matrix, allocates track regulators to the application phases.

This is described as an example in connection with the second command line "takeoff (speed=120, heading=180)" in an application script: In the maneuver table (FIG. 3), the interpreter finds the word "takeoff" in line 2. Thus, via the regulator control, it activates all track regulators in the column of which there appears the number "1", and deactivates all track regulators 12 when the number "0" appears in the corresponding column. The interpreter further recognizes the word "speed" and allocates the track regulator 12 for speed to this command. In this manner, the nominal or desired value "120" is allocated to this track regulator 12 on the basis of a pre-determined dimensioning or normalization. Analogously, the interpreter proceeds with the information "heading=180". If this information should be missing, then an adjusted pre-set value is used, and the aircraft is steered or controlled in this direction.

After the starting of the concerned application phase, for example through pressing of a functional button "ON", the track guidance system 1 begins to execute the respective command line of the application script available in the application control 4 from the script development function 3.

Next, the operation sequence according to the invention, in the execution of the command line 4 "Cruise Flight" of the illustrated application script is explained in an exemplary manner, whereby this method is utilizable on any other desired application phases or application types or modes of the vehicle:

The parameter for the speed (200) is transferred to a track regulator 12a, here a thrust regulator;

the parameter for the heading (110) is transferred to a further track regulator 12b, here a heading regulator;

the parameter for the flight altitude (=5000) is transferred to a further track regulator 12c, here an altitude regulator;

the application control 4 begins the maneuver "Cruise Flight";

for this purpose, the regulator control 10 simultaneously begins the track regulators (12a, 12b, 12c) for speed, heading and flight altitude corresponding to the regulator matrix;

the activated track regulators 12 endeavor to adjust and maintain the vehicle to the prescribed nominal or desired values; as soon as a nominal or desired value is reached, this is notified to the regulator control 10 via the connection 10b;

the maneuver "Cruise Flight" is ended when all track regulators 12 have reached their nominal or desired values, or when alternative conditions are met (for example location, time, states or status conditions, switch positions);

the regulator control 10 notifies the application control 4 that the maneuver "Cruise Flight" has been ended;

the application control 4 processes the next command line for the next application phase from the application script, in the described example, the application phase "Right Curve".

The invention claimed is:

1. A vehicle guidance system for guiding a vehicle with reference to pre-specified desired values of vehicle travel parameters in plural application phases, whereby the vehicle guidance system comprises:
  a script development function (3) for developing an application script that defines pre-specified desired values of the vehicle travel parameters in the plural application phases, according to which the vehicle is to be guided,
  regulators (12; 12a, 12b, 12c) for guiding the vehicle with reference to the pre-specified desired values of the vehicle travel parameters,
  an input function (2) for developing a regulator matrix by a user input, wherein the regulator matrix allocates the regulators to the application phases, and for modifying the regulator matrix by a user input on the basis of altered application phases,
  an application control (4) for controlling the time sequence of the application phases on the basis of the pre-specified desired values, and
  a regulator control (10) for activating a respective one of the regulators relevant in the respective application phase as allocated in the regulator matrix, wherein the activated respective regulator (12; 12a, 12b, 12c) is adapted to transfer a regulator status thereof for control or monitoring to the regulator control.

2. The vehicle guidance system according to claim 1, characterized in that the transferring of the regulator status is carried out continuously.

3. The vehicle guidance system according to claim 2, characterized in that the application script is externally manipulable by a user input via the script development function during the vehicle application or utilization.

4. The vehicle guidance system according to claim 1, characterized in that the application script is externally manipulable by a user input via the script development function during the vehicle application or utilization.

5. A vehicle guidance system for controlling vehicle travel parameters of the travel of a vehicle, comprising:
  plural control devices that are respectively adapted to control the vehicle travel parameters of the travel of the vehicle; plural regulators that are connected to and respectively adapted to regulate the control devices in response to and dependent on pre-specified desired values respectively allocated to the vehicle travel parameters;
  a script development unit with a first input, that is adapted to prepare an application script based on script input data via the first input, wherein the application script includes plural application phases according to which the vehicle travel parameters are to be controlled in a logical or temporal operation sequence, the application phases define the pre-specified desired values respectively allocated to the vehicle travel parameters, and each one of the application phases respectively includes at least one of the pre-specified desired values respectively allocated to at least one of the vehicle travel parameters;
  a regulator allocation unit, which has a second input, and which is adapted to prepare a regulator allocation data set based on regulator allocation input data via the second input, and by which the regulator allocation data set can be modified based on further input data via the second input, wherein the regulator allocation data set is adapted to respectively allocate at least one selected regulator among the regulators to be active for each one of the application phases;
  an application control that is connected to the script development unit to receive therefrom the application script, and that is connected to the regulator allocation unit to receive therefrom the regulator allocation data set, and that is adapted to successively process the application phases of the application script;
  a regulator control that is connected to the application control and respectively to the regulators, and that is adapted to respectively activate the at least one selected regulator that is allocated to a respective current active one of the application phases by the regulator allocation data set, and that is adapted to respectively transmit to each said selected regulator the pre-specified desired value respectively allocated to the vehicle travel parameter controlled by the control device regulated by the selected regulator; and
  regulator status feedback connections from the regulators to the regulator control to transmit regulator status information from the regulators to the regulator control.

6. A method of controlling vehicle travel parameters of the travel of a vehicle, comprising steps:
  a) providing an application script that includes plural application phases according to which the vehicle travel parameters are to be controlled in a logical or temporal operation sequence, wherein the application script defines pre-specified desired values respectively allocated to the vehicle travel parameters for a respective one of the application phases, and wherein each one of the application phases respectively includes at least one of the pre-specified desired values respectively allocated to at least one of the vehicle travel parameters;
  b) providing a regulator allocation data set that respectively allocates, among plural regulators, at least one selected regulator to be active for each one of the application phases, wherein the regulators are respectively adapted to regulate the vehicle travel parameters of the travel of the vehicle;
  c) successively processing the application phases of the application script to respectively obtain the at least one pre-specified desired value respectively allocated to the at least one vehicle travel parameter in a respective current active one of the application phases that is currently being processed;
  d) dependent on the regulator allocation data set, activating only the at least one selected regulator that is to be active for the current active application phase as allocated by the regulator allocation data set;

e) transmitting to the at least one selected regulator that has been activated in said step d), the respective pre-specified desired value that is respectively allocated in the application script to the associated one of the vehicle travel parameters to be regulated by the respective selected regulator;

f) using the at least one selected regulator, respectively regulating the associated one of the vehicle travel parameters associated with the selected regulator so that the associated vehicle travel parameter achieves the pre-specified desired value allocated thereto in the application script for the current active application phase; and g) modifying the regulator allocation data set to provide an altered allocation of at least one of the regulators to one of the application phases that is to be altered.

\* \* \* \* \*

UNITED STATES PATENT AND TRADEMARK OFFICE
CERTIFICATE OF CORRECTION

PATENT NO. : 7,120,538 B2  
APPLICATION NO. : 10/483578  
DATED : October 10, 2006  
INVENTOR(S) : Seifert Page 1 of 1

It is certified that error appears in the above-identified patent and that said Letters Patent is hereby corrected as shown below:

<u>Column 3,</u>  
Line 10, before "delivering", delete --the purpose of--;  
Line 12, after "describes", insert --or defines pre-specified nominal or desired--.

<u>Column 5,</u>  
Line 21, after "the", replace "vehicle fixed" by --vehicle-fixed--;  
Line 21, after "or", replace "track fixed" by --track-fixed--;  
Line 42, after "connection", replace "1Ob" by --10b--;

<u>Column 7,</u>  
Lines 45 to 47, delete these lines (see lines 48 to 50);

<u>Column 9,</u>  
Line 58, after "vehicle;" insert a paragraph break return.

Signed and Sealed this

Eighth Day of May, 2007

JON W. DUDAS  
*Director of the United States Patent and Trademark Office*